United States Patent
Kuwahara

[11] Patent Number: 6,025,664
[45] Date of Patent: Feb. 15, 2000

[54] PERMANENT MAGNET VEHICLE BRAKING APPARATUS

[75] Inventor: Tohru Kuwahara, Kawasaki, Japan

[73] Assignee: Isuzu Motors Limited, Japan

[21] Appl. No.: 09/219,103

[22] Filed: Dec. 22, 1998

[51] Int. Cl.[7] .................................................. H02K 7/10
[52] U.S. Cl. ................................ 310/77; 310/86; 310/93; 310/104; 310/105; 464/29; 192/84.3; 188/267; 188/158; 188/161; 188/164
[58] Field of Search .................................... 310/77, 86, 93, 310/104, 105; 464/29; 192/84.3; 188/267, 158, 161, 164

[56] References Cited

U.S. PATENT DOCUMENTS

| | | | |
|---|---|---|---|
| 5,054,587 | 10/1991 | Matsui et al. | 188/267 |
| 5,064,029 | 11/1991 | Araki et al. | 188/267 |
| 5,143,183 | 9/1992 | Kuwahara | 188/158 |
| 5,145,038 | 9/1992 | Kuwahara | 188/158 |
| 5,219,050 | 6/1993 | Kubomiya | 188/267 |
| 5,238,095 | 8/1993 | Pedu | 192/84.1 |
| 5,303,802 | 4/1994 | Kuwahara | 188/158 |
| 5,804,897 | 9/1998 | Kuwahara | 310/77 |
| 5,855,256 | 1/1999 | Kuwahara | 188/164 |

Primary Examiner—Thomas M. Dougherty
Assistant Examiner—Thanh Lam
Attorney, Agent, or Firm—John E. Toupal; Harold G. Jarcho

[57] ABSTRACT

A vehicle braking system including a brake drum connected to a rotational shaft; an annular member formed of a ferromagnetic material; a guide frame for supporting the annular member in a position within said spaced from an inner surface of the brake drum; and a cylindrical body defining an uninterrupted wall between the inner surface of the brake drum and the annular member; at least portions of the cylindrical body disposed directly between the inner surface of the brake drum and outer surfaces of the permanent magnets being formed from a magnetically permeable material. Also included are a plurality of annularly arranged permanent magnets circumferentially spaced apart in positions of uniform pitch, the polarities of the permanent magnets facing the inner surface of said brake drum alternating circumferentially; and an actuator for producing axial movement of the annularly arranged permanent magnets into active positions within the brake drum and between the inner surface of the brake drum and the annular member, and inactive positions out of the brake drum. The provision of the cylindrical body with magnetically permeable portions reduces the non-magnetic gap between the brake drum and magnets to thereby increase braking torque.

17 Claims, 3 Drawing Sheets

PERMANENT MAGNET VEHICLE BRAKING APPARATUS

BACKGROUND OF THE INVENTION

This invention relates generally to a vehicle braking system having an eddy current reduction retarder for imparting braking force to the vehicle, and more particularly, to a permanent magnet type eddy current reduction retarder apparatus of reduced weight and increased braking ability.

As disclosed in Japanese Patent Application Laid-Open No. 3(1991)-86.061, a permanent magnet support cylinder is received by an annular guide frame constituting a part of a protective case. During braking, the magnet support cylinder projects into a brake drum, and the permanent magnets form magnetic circuits between the magnets and the brake drum through ferromagnetic pole pieces of the guide frame. When the rotating brake drum traverses the magnetic fields, eddy currents are generated to produce a braking force in a direction reversed to the rotational direction of the brake drum.

However, in that conventional eddy current retarder device, the magnetic flux passes through thick ferromagnetic pole pieces resulting in a reduction in the magnetic flux arriving at the brake drum and a corresponding reduction in the braking force. A further reduction in braking force is caused by the large electric conductivity of the brake drum. In addition, since the ferromagnetic pole pieces are connected to the guide frame, the overall construction is complex, manufacturing cost is high and weight is increased.

An improved permanent magnet type eddy current reduction device is disclosed in U.S. Pat. No. 5,804,897. That device provides a non-magnetic (for example, austenite stainless steel) tubular element on a guide tube opposed to an inner peripheral surface of a brake drum to reduce weight of the guide tube while also preventing entry of dust or muddy water. However, in the aforementioned device, the air gap between the inner peripheral surface of the brake drum and the guide tube (strictly, the non-magnetic gap between the inner peripheral surface of the brake drum and the outer surface of the magnets) is so large that braking force is reduced.

The object of the present invention, therefore, is to provide an improved permanent magnet type eddy current braking apparatus which exhibits reductions in cost and weight and increased braking ability.

SUMMARY OF THE INVENTION

The invention is a vehicle braking system including a brake drum connected to a rotational shaft; an annular member formed of a ferromagnetic material; a guide frame for supporting the annular member in a position within and spaced from an inner surface of the brake drum; and a cylindrical body defining an uninterrupted wall between the inner surface of the brake drum and the annular member; at least portions of the cylindrical body disposed directly between the inner surface of the brake drum and outer surfaces of the permanent magnets being formed from a magnetically permeable material. Also included are a plurality of annularly arranged permanent magnets circumferentially spaced apart in positions of uniform pitch, the polarities of the permanent magnets facing the inner surface of said brake drum alternating circumferentially; and an actuator for producing axial movement of the annularly arranged permanent magnets into active positions within the brake drum and between the inner surface of the brake drum and the annular member, and inactive positions out of the brake drum. The provision of the cylindrical body with magnetically permeable portions reduces the non-magnetic gap between the brake drum and magnets to thereby increase braking torque.

According to one feature of the invention, the cylindrical body includes first portions disposed directly between the inner surface of the brake drum and outer surfaces of the circumferentially spaced apart permanent magnets and second portions disposed between the inner surface of the brake drum and spaces between the circumferentially spaced apart permanent magnets and the first portions are formed from a first material having a given magnetic permeability and the second portions are formed from a second material having a magnetic permeability substantially less than the given magnetic permeability. The use of cylindrical body having first and second portions of different magnetic permeability reduces magnetic flux leakage to further enhance braking performance.

According to another feature of the invention, the first portions are formed from a weak magnetic material such as iron or steel, and the second portions are formed of a non-magnetic material such as aluminum or stainless steel. The provision of non-magnetic second cylindrical body portions maximizes reduction of magnetic flux leakage to optimize braking performance.

In one embodiment of the invention, the first cylindrical body portions are circumferentially separated by slots, and the second cylindrical body portions are formed by plates secured to the first portions and covering the slots. The plates facilitate construction of the desired cylindrical body of different magnetic permeability.

According to certain features of the above embodiment, the first portions have a uniform given thickness, the second portions have a uniform thickness less than the given thickness; and the second portions have outwardly projecting peripheral flange portions secured to inner surface portions of the first portions, and central portions projecting toward the spaces between said permanent magnets. These structural features simplify assembly and reduce cost.

In another embodiment of the invention, the first cylindrical body portions are formed by a cylinder having openings radially aligned with the spaces, and the second portions are formed by plates secured to the first portions and covering the openings. These features enhance structural stability of the cylindrical body.

In yet another embodiment of the invention, the first cylindrical body portions are formed by a cylinder formed from the first material, the first portions have a uniform given thickness, the cylinder has third portions aligned with the spaces and a thickness less than the given thickness, and the second cylindrical body portions are formed by plates covering the third portions. This embodiment is particularly effective in improving braking efficiency.

In still another embodiment of the invention, the entire cylindrical body first is formed from a magnetic material such as iron, a suitable material such as nickel is applied to the second portions of the cylindrical body, and heat is applied to produce an iron-nickel alloy having the tissue of austenite. In this embodiment, the initial cylindrical body can be molded easily onto the guide tube and then heat treated to provide the first and second portions of different magnetic permeability.

BRIEF DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENTS

Figure 1:
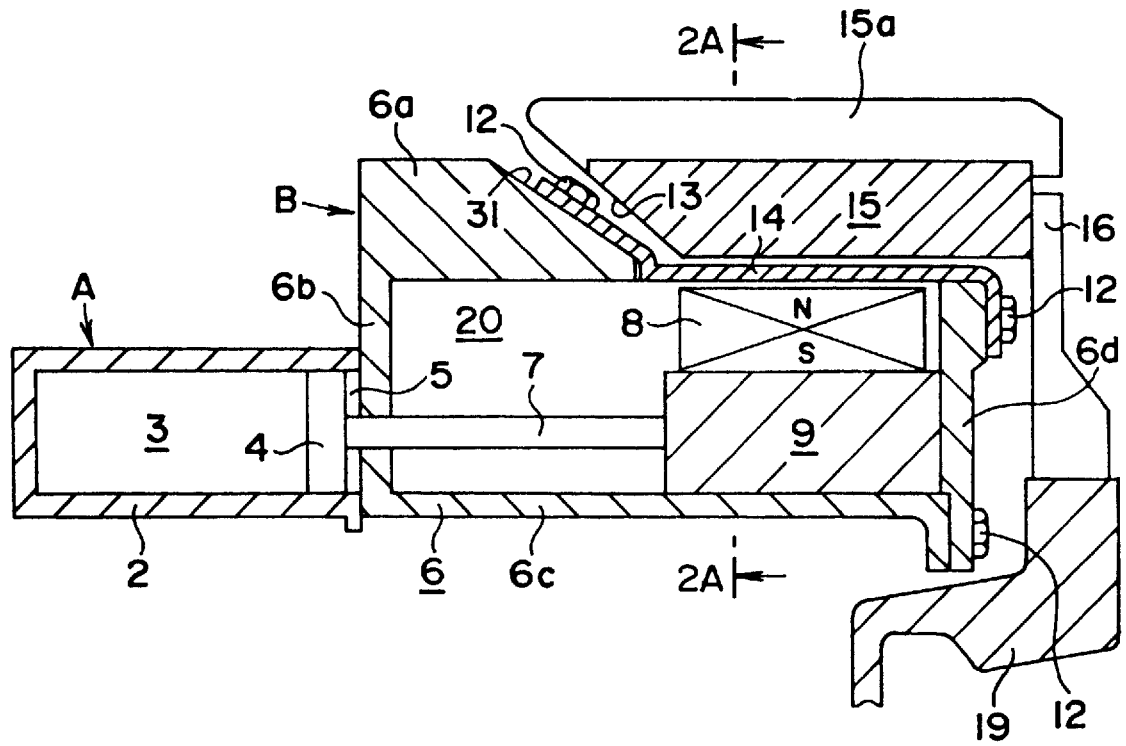
FIG. 1 is a side sectional view of a permanent magnet type eddy current reduction apparatus according to the present invention.

As shown in FIG. 1, a brake drum 15 is provided with cooling fins 15a and has a right end connected by welding or the like to a number of spokes 16. Supporting the radially extending spokes 16 is a disk-like mounting flange 19 which is connected to an output shaft of a vehicular transmission or speed change gear (not shown). A left end of the brake drum 15 is formed with a conical surface 13 so that heat within the brake drum 15 is diffused outwardly.

An annular guide frame B is secured, for example, to the wall of the speed change gear (not shown) and defines an annular inner closed chamber 20 having a rectangular shape in section. A right half of the guide frame B extends into the brake drum 15 leaving a slight clearance. More specifically, the guide frame B is composed of an annular frame body 6 in the form of a C-shape in section and formed of a ferromagnetic material such as iron, a thin cylindrical body 14 facing an inner surface of the brake drum 15 and formed of a weak magnetic material, and an annular cover plate 6d. The frame body 6 integrally includes an end wall 6b, an outer cylindrical wall portion 6a having substantially the same wall-thickness as the brake drum 15, and an inner cylindrical wall portion 6c. Attaching the cover plate 6d to the right end of the inner wall 6c are a plurality of bolts 12. The outer cylindrical wall portion 6a is formed with a conical surface 31 facing the conical surface 13 of the brake drum 15.

According to the present invention, the cylindrical body 14 preferably is a thin plate having 0.4 to 1.0 mm of thickness and formed of a weak magnetic material such as SPCC, SPHC, SS41 or the like. The cylindrical body 14 faces the inner surface of the brake drum 15 and is connected between the conical surface 31 of the outer cylindrical wall portion 6a and the outer peripheral edge of the cover plate 6d by a plurality of bolts 12 in order to seal the chamber 20 of the guide frame B. Formed at the left end of the cylindrical body 14 is a conical portion mated to the conical surface 31 and formed at the right end of the body 14 is a radially inwardly projecting flange portion engaging the outer peripheral edge of the cover plate 6d.

A magnet support cylinder 9 having substantially the same wall thickness as the brake drum 15 is accommodated in the chamber 20 of the guide frame B. Forming the magnet support cylinder 9 is an annular member formed of a ferromagnetic material such as iron and is axially slidably supported by the inner cylindrical wall portion 6c. A plurality of permanent magnets 8 are fastened to the outer surface of the annular magnet support member 9 in circumferentially spaced apart positions of uniform pitch. The magnets 8 are provided with magnetic poles of circumferentially alternating polarity facing the inner surface of the brake drum 15.

A plurality (preferably three) of circumferentially distributed actuators A are connected to the cover plate 6b. Each actuator includes a piston-cylinder assembly coupled to the annular magnet support member 9. The actuators A drive the annular member 9 and supported magnets 8 between a braking position projected within the brake drum 15 (shown in FIG. 1) and a non-braking position with the magnet support member 9 withdrawn from the brake drum 15 and in contact with the end wall 6b. Each actuator A includes a cylinder 2 divided into a pair of chambers 3 and 5 by a piston 4. Connecting each piston 4 to the magnet support member is a rod 7 projecting through the end wall 6b and the annular chamber 20 of the guide frame B.

Figure 2:
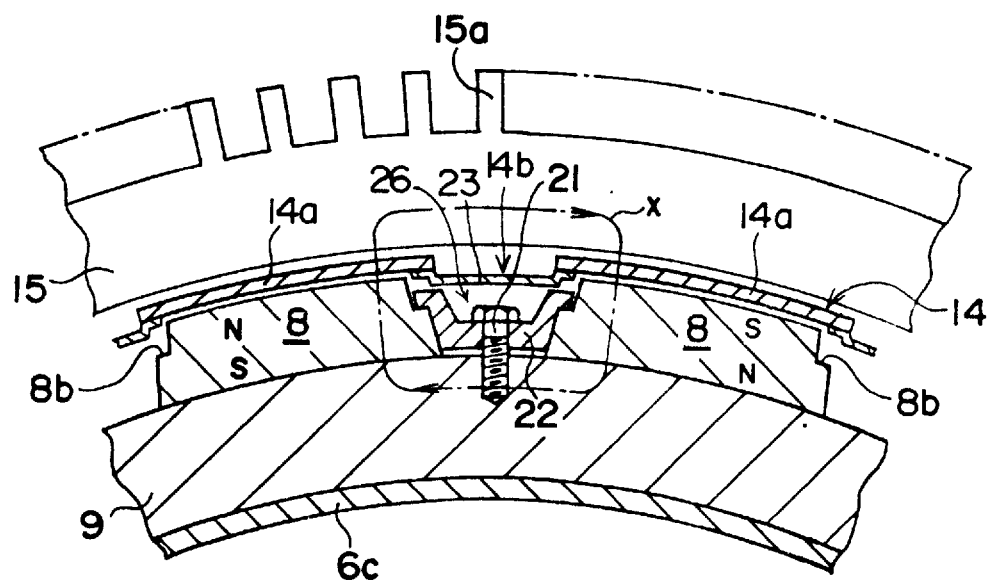
FIG. 2 is a sectional view taken on lines 2A—2A of FIG. 1.

As shown in FIG. 2, each magnet 8 is in the form of a block and is secured to the annular magnet support member 9 by a pair of attachment members 22 having a U-shaped in section and attachment bolts 21. Each member 22 has ends placed upon shoulders 8b formed on ends of each magnet 8 and is fastened to the magnet support member 9 by a bolt 21.

The operation of the present invention now will be described. When braking, the magnet support member 9 is pushed by the actuators A into positions at which the magnets 8 are adjacent to the inner surface of the brake drum 15 (FIG. 1). In those positions, the magnets 8 exert on the brake drum 15 a magnetic field via the thin cylindrical body 14 to form a magnetic circuit x (FIG. 2) between the brake drum 15 and the magnet support member 9. As the rotating brake drum 15 traverses the magnetic field, eddy current flow in the brake drum 15 generates a braking torque. Because the cylindrical body 14 is somewhat magnetic, the length of non-magnetic gap between the inner surface of the brake drum 15 and the outer surfaces of the magnets 8 is reduced to enhance that braking torque.

When braking is to terminate, hydraulic pressure fluid is supplied to the chambers 5 of the actuators A, and fluid is discharged from the chamber 3. As a result thereof, the magnet support member 9 is pulled leftwardly by the piston 4 until it contacts the end wall 6b. The magnets 8 correspondingly are withdrawn from the interior of the brake drum 15 to produce a magnetic circuit between the outer end wall portion 6a of the guide frame B and the magnet support member 9, and magnetic field is removed from the brake drum 15.

According to the present invention, braking force is increased further by preventing short-circuiting magnetic flux leakage between the magnets 8 since such leakage does not contribute to the applied brake torque. Leakage is prevented by providing for the cylindrical body 14 first portions 14a (FIG. 2) disposed directly between the inner surface of the brake drum 15 and outer surfaces of the permanent magnets 8 and second portions 14b disposed between the inner surface of the brake drum 15 and spaces 26 between the circumferentially spaced apart permanent magnets 8. The first portions 14a are formed from a first material having a given magnetic permeability and the second portions are formed from a second material having a magnetic permeability substantially less than the given magnetic permeability of the first portions 14a.

In the embodiment shown in FIG. 2, the first portions 14a covering the outer surfaces of the magnets 8 and the second portions 15b covering the space 26 between the magnets 8 are separated. The first portions 14a are formed from a weak magnetic material such as SPCC, SPHC or SS41 while the second portions 14b are formed from a non-magnetic material such as aluminum or stainless steel. As shown, each portion 14b is a plate bent into a U-shape with opposite edges defining peripheral flange portions secured to inner surfaces of the first portions 14a by welding or the like to form the cylindrical body 14. Preferably, the first portions 14a have a uniform given thickness and the second portions have a uniform thickness less than the given thickness of the first portions 14a. Also, the plates 14b have central portions projecting toward the spaces 26 between the permanent magnets 8.

Figure 3:
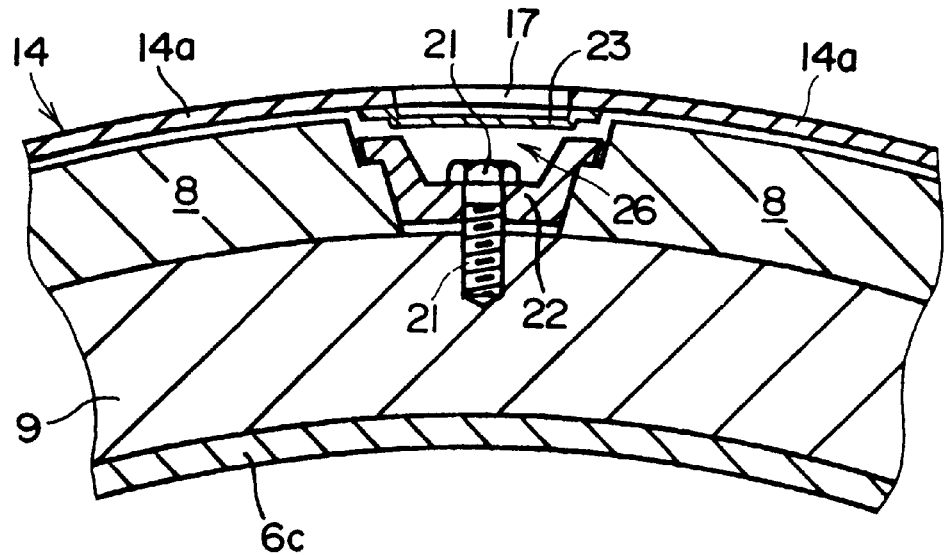
FIG. 3 is a sectional view of a permanent magnet type eddy current reduction apparatus according to a second embodiment of the invention.

In the embodiment shown in FIG. 3, the cylindrical body 14 of the guide tube B is formed of a weak magnetic material and has rectangular openings 17 radially aligned with the spaces 26 between the magnets 8. Covering each of the openings 17 is a reinforcing plate 23 formed of a non-magnetic material such as aluminum, stainless or the like and having peripheral flange portions secured to the inner surface of the cylindrical body 14. Again, central portions of the plates 23 project toward the spaces 26 between the magnets 8 relative to the first portions 14b.

Figure 4:
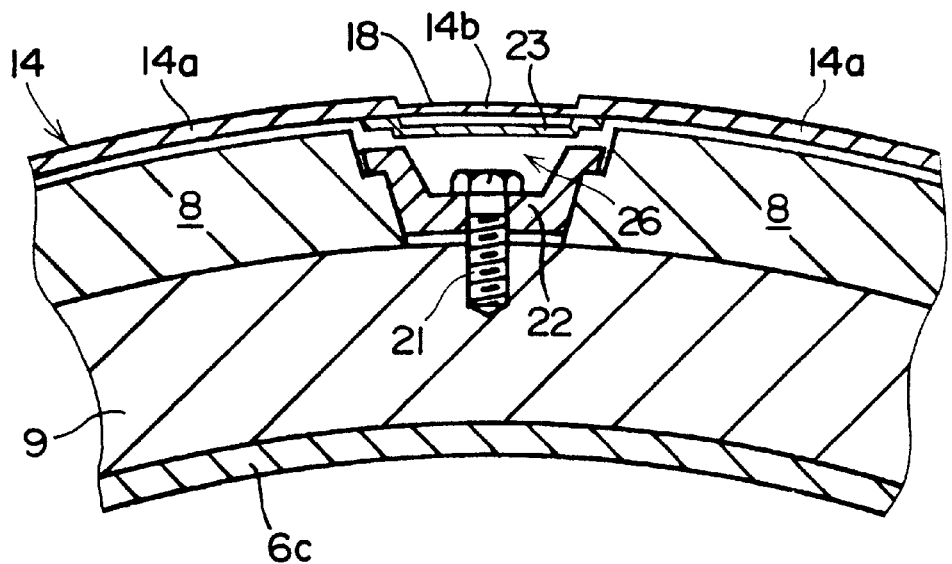
FIG. 4 is a sectional view of a permanent magnet type eddy current reduction apparatus according to a third embodiment of the invention.

In the embodiment shown in FIG. 4, the cylindrical body 14 on the guide tube B has first portions 14a, and third portions 14b formed of a weak magnetic material such as steel and second portions formed by plates 23 formed of a non-magnetic material. In this embodiment, grooves 18 aligned with the spaces 26 between the magnets 8 and extending in an axial direction of the brake drum 15 provides the third portions 14b with a thickness less than the uniform given thickness of the first portions 14a. Again, the plates 23 have U-shaped sections and opposite edges forming flange portions secured to inner surfaces of the cylindrical body 14 by welding or the like.

Figure 5:
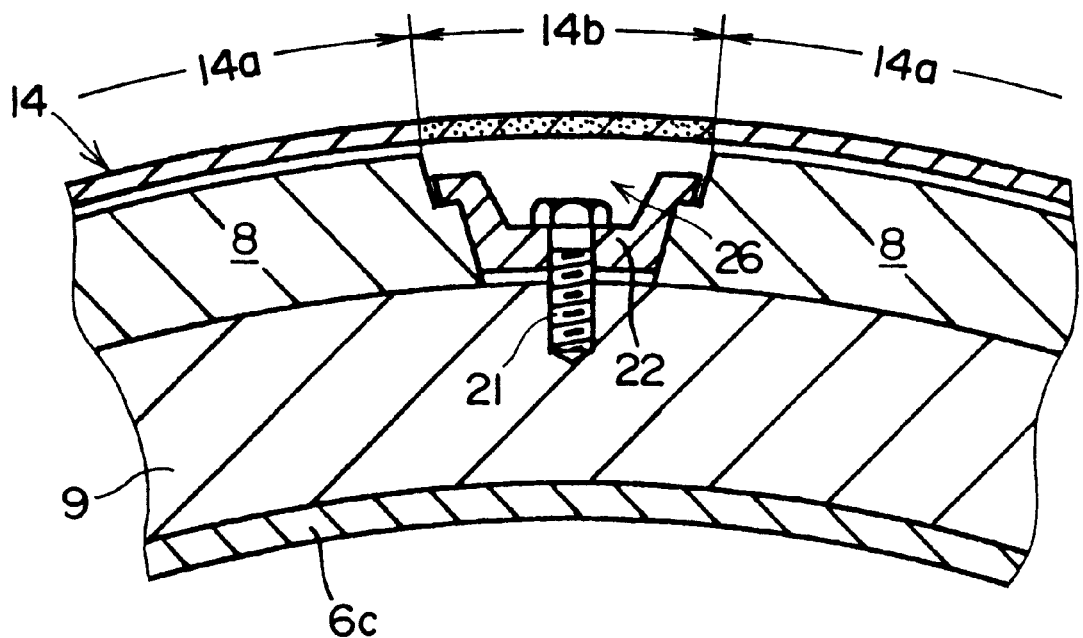
FIG. 5 is a sectional view of a permanent magnet type eddy current reduction apparatus according to a fourth embodiment of the invention.

In the embodiment shown in FIG. 5, the entire cylindrical body 14 on the guide tube B is formed from a weak-magnetic material such as iron and has a uniform wall thickness. After formation of the body 14, a sheet (not shown) of material such as nickel is placed on each of the second portions 14b aligned with the spaces 26 between the magnets 8. The superposed sheets (not shown) are heated to a temperature of 1,000° C. or more to alloy the nickel thereof with the iron of the body 14 (the nickel is diffused into the iron). That process results in converting the second portions 14b covering the spaces 26 between the magnets 8 into the tissue of austenite. Alternatively, nickel plating is applied to the second portions 14b on the cylindrical body 14 covering the spaces 26 between the magnets 8 and the nickel is alloyed with iron by heat treatment to produce the tissue of austenite. According to this embodiment, the cylindrical body 14 can be molded easily onto the guide tube B, and after the application of heat, the portions 14a radially aligned with the outer surfaces of the magnets 8 remain a ferromagnetic substance, while the portions 14b aligned with the spaces 26 between the magnets 8 are transformed into austenite to provide a non-magnetic substance. In another alternative embodiment of the invention, the cylindrical body 14 on the guide tube B is formed of an austenite stainless (a non-magnetic material), and only the first portions 14a covering the outer surfaces of the magnets 8 are hammered to transform them into the tissue of martensite (a magnetic substance).

The present invention eliminates the need for ferromagnetic plates (pole pieces) to protect the magnets 8 and induce a magnetic field. By disposing the thin cylindrical body 14 closely adjacent to the inner surface of the brake drum 15, the magnets 8 can be positioned more closely to the inner peripheral surface of the brake drum 15 to thereby enhance braking force. In other words, even if the radius of the brake drum 15 is reduced by a thickness of the ferromagnetic plates (not shown) of the prior art, the sufficient brake force is obtained to enable mounting of the eddy current reduction apparatus on small vehicles.

It will be understood that the first portions 14a covering the outer surfaces of the magnets 8 need not be a highly magnetic substance but can be a weak-magnetic substance, and the second portions 14b covering the spaces 26 between the magnets 8 need not be completely non-magnetic. If the cylindrical body 14 is extremely thin, or the magnets 8 are greatly spaced apart, the material forming the first portions 14a can be the same as that forming of the portions 14b. The relative difference in magnetic properties between the first portions 14a and the second portions 14b can be selected considering processing cost and brake performance desired.

While in the above-described embodiments, a description has been made of the construction of a cylindrical body 14 for protecting the magnets 8, it is to be noted that the body 14 could be replaced by copper plating applied to the inner peripheral surface of the brake drum 15, or a circulator could be mounted within the guide tube B to lower temperature. Also, copper plating or the like can be applied to the inner peripheral surface of the brake drum 15 to further enhance braking performance.

Obviously, many modifications and variations of the present invention are possible in light of the above teachings. It is to be understood, therefore, that the invention can be practiced otherwise than as specifically described.

What is claimed is:

1. Vehicle braking apparatus comprising:
    a brake drum connected to a rotational shaft;
    an annular member formed of a ferromagnetic material;
    a guide frame for supporting said annular member in a position within and spaced from an inner surface of said brake drum;
    a plurality of annularly arranged permanent magnets circumferentially spaced apart within said brake drum in positions of uniform pitch, the polarities of said permanent magnets facing said inner surface of said brake drum alternating circumferentially;
    a cylindrical body defining an uninterrupted wall between said inner surface of said brake drum and said annular member; said cylindrical body being at least partially formed from a magnetically permeable material and comprising first portions disposed directly between said inner surface of said brake drum and outer surfaces of said circumferentially spaced apart permanent magnets and second portions disposed between said inner surface of said brake drum and spaces between said circumferentially spaced apart permanent magnets; said first portions having a uniform given thickness and being formed from a first material having a given magnetic permeability and said second portions having a uniform thickness less than said given thickness and being formed from a second material having a magnetic permeability substantially less than said given magnetic permeability; and
    an actuator means for producing axial movement of said annularly arranged permanent magnets into active positions within said brake drum and between said inner surface of said brake drum and said annular member, and inactive positions out of said brake drum.

2. An apparatus according to claim 1 wherein said first portions are formed from a weak magnetic material such as SPCC, SPHC or SS41, said second portions are formed of a non-magnetic material such as aluminum or stainless steel.

3. An apparatus according to claim 1 wherein said first portions are circumferentially separated by slots, and said second portions are formed by plates secured to said first portions and covering said slots.

4. An apparatus according to claim 3 wherein said second portions have outwardly projecting peripheral flange portions secured to inner surface portions of said first portions, and central portions projecting toward said spaces between said permanent magnets.

5. An apparatus according to claim 1 wherein said first portions are formed by a cylinder having openings radially aligned with said spaces, and said second portions are formed by plates secured to said first portions and covering said openings.

6. An apparatus according to claim 5 wherein said second portions have outwardly projecting peripheral flange portions secured to inner surface portions of said first portions, and central portions projecting toward said spaces between said permanent magnets.

7. An apparatus according to claim 1 wherein said first portions are formed by a cylinder formed from said first material, said cylinder having third portions aligned with said spaces and having a thickness less than said given thickness, and said second portions are formed by plates covering said third portions.

8. An apparatus according to claim 7 wherein said second portions have outwardly projecting peripheral flange portions secured to inner surface portions of said first portions, and central portions projecting toward said spaces between said permanent magnets.

9. An apparatus according to claim 8 wherein said first portions are formed from a weak magnetic material such as SPCC, SPHC or SS41, said second portions are formed of a non-magnetic material such as aluminum or stainless steel.

10. An apparatus according to claim 1 wherein said second material is an alloy of said first material.

11. An apparatus according to claim 10 wherein said second material is an austenite.

12. An apparatus according to claim 11 wherein said first portions are formed from a weak magnetic material such as SPCC, SPHC or SS41, said second portions are formed of a non-magnetic material such as aluminum or stainless steel.

13. An apparatus according to claim 1 wherein said guide frame defines a closed annular chamber retaining said permanent magnets and partially formed by said cylindrical body, said guide frame having one end secured to a vehicle body and an opposite end projecting into said brake drum.

14. An apparatus according to claim 13 wherein said guide frame has an outer wall formed by said cylindrical body and facing said inner surface of said brake drum, and an inner wall supporting said annular member.

15. An apparatus according to claim 14 wherein said cylindrical body is a thin plate of weak magnetic material having a thickness of 0.4 to 0.8 mm.

16. An apparatus according to claim 15 wherein said permanent magnets are supported by said annular member and movable therewith as a unit by said actuator.

17. An apparatus according to claim 16 including attachment members, each secured between said annular member and adjacent ends of a different pair of said permanent magnets.

* * * * *